US012625741B2

(12) United States Patent
Farley et al.

(10) Patent No.: US 12,625,741 B2
(45) Date of Patent: May 12, 2026

(54) LCS RESOURCE DEVICE FUNCTIONALITY PROVISIONING SYSTEM

(71) Applicant: Dell Products L.P., Round Rock, TX (US)

(72) Inventors: Douglas Lang Farley, Round Rock, TX (US); Ethan A. Kaley, North Kingstown, RI (US); Geoffrey A. Reid, Littleton, MA (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 826 days.

(21) Appl. No.: 17/854,958

(22) Filed: Jun. 30, 2022

(65) Prior Publication Data

US 2024/0004722 A1     Jan. 4, 2024

(51) Int. Cl.
*G06F 9/50* (2006.01)

(52) U.S. Cl.
CPC ................................. *G06F 9/5083* (2013.01)

(58) Field of Classification Search
CPC ...... G06F 9/5083; G06F 9/5044; G06F 9/547; G06F 9/5072
See application file for complete search history.

(56) References Cited

U.S. PATENT DOCUMENTS

| | | | | |
|---|---|---|---|---|
| 7,962,545 | B2 * | 6/2011 | Knauerhase | ........ H04L 61/4541 709/224 |
| 10,666,528 | B1 * | 5/2020 | Okman | .................. G06Q 30/04 |
| 11,522,755 | B1 * | 12/2022 | Warkhedi | .............. H04L 41/046 |
| 2016/0219097 | A1 * | 7/2016 | Gupte | ..................... H04L 67/10 |
| 2018/0013696 | A1 * | 1/2018 | Nedeltchev | ........... H04L 47/822 |
| 2020/0374974 | A1 * | 11/2020 | Sun | ......................... H04L 41/20 |
| 2023/0030371 | A1 * | 2/2023 | Martínez Huerta | ........................ G06Q 10/06312 |

* cited by examiner

*Primary Examiner* — Bing Zhao
*Assistant Examiner* — Willy W Huaracha
(74) *Attorney, Agent, or Firm* — Joseph Mencher

(57) ABSTRACT

A Logically Composed System (LCS) resource device functionality provisioning system includes an orchestrator device coupled to resource devices and a resource management system. The orchestrator device identifies functionality available from the resource devices via at least one resource device communication protocol, and advertises logical functions that correspond to the functionality available from the resource devices to the resource management system via a resource management system communication protocol that is different than the at least one resource device communication protocol. When the orchestrator device receives a request from the resource management system via the resource management system communication protocol to utilize a subset of the logical functions to provide an LCS, it configures the subset of the logical functions to provide the LCS via the at least one resource device communication protocol, and provides the LCS to a client device using the subset of the logical functions.

17 Claims, 13 Drawing Sheets

302

RESOURCE MANAGEMENT SYSTEM 304

RESOURCE SYSTEM 306a

RESOURCE SYSTEM 306b

RESOURCE SYSTEM 306c

LCS PROVISIONING SUBSYSTEM 300

800

ORCHESTRATOR DEVICE IDENTIFIES FUNCTIONALITY AVAILABLE FROM RESOURCE DEVICES USING RESOURCE DEVICE COMMUNICATION PROTOCOL(S)
802

ORCHESTRATOR DEVICE ADVERTISES LOGICAL FUNCTIONS TO RESOURCE MANAGEMENT SYSTEM USING RESOURCE MANAGEMENT SYSTEM COMMUNICATION PROTOCOL
804

ORCHESTRATOR DEVICE RECEIVES REQUEST TO UTILIZE SUBSET OF LOGICAL FUNCTIONS TO PROVIDE LCS FROM RESOURCE MANAGEMENT SYSTEM VIA RESOURCE MANAGEMENT SYSTEM COMMUNICATION PROTOCOL
806

ORCHESTRATOR DEVICE CONFIGURES SUBSET OF LOGICAL FUNCTIONS TO PROVIDE LCS USING RESOURCE DEVICE COMMUNICATION PROTOCOL(S)
808

ORCHESTRATOR DEVICE PROVIDES LCS TO CLIENT DEVICE USING SUBSET OF LOGICAL FUNCTIONS
810

FIG. 8

LCS RESOURCE DEVICE FUNCTIONALITY PROVISIONING SYSTEM

BACKGROUND

The present disclosure relates generally to information handling systems, and more particularly to providing resource device functionality for use in Logically Composed Systems (LCSs) that are provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS) system or other resource system known in the art, with resource devices included within and/or outside of that resource system (e.g., processing devices and memory devices on a motherboard in the BMS system used to provide an Operating System (OS) for the LCS, storage devices, networking devices, etc.) used to perform the functionality for the LCS. However, most conventional resource systems (e.g., the BMS systems discussed above) utilize REpresentational State Transfer (REST)-based management techniques (e.g., management interface protocols provided according to the REDFISH® specification that is used as the primary default platform reporting mechanism in many server devices) for managing the resource systems and any connected resource devices, which can raise some issues.

For example, the REST-based management techniques discussed above utilize relatively complex inventory mechanisms to build topologies, and require each of the resource system and resource devices to support those REST-based management techniques. Furthermore, the REST-based management techniques discussed above enable point-in-time physical control, reporting, and/or other management operations with physical resource devices, but are not easily extended to logical functionality available from those resource devices. Further still, any resource devices available to provide an LCS may include their own Application Programming Interface (API) infrastructure, and the REST-based management techniques discussed above present difficulties when reconciling different API ecosystems. As such, conventional REST-based management techniques are not scalable in a manner that will allow the LCSs discussed above to be easily and efficiently composed from a variety of physical and logical functionality available from resource devices that will often be provided in different domains.

Accordingly, it would be desirable to provide an LCS resource device functionality provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: identify, via at least one resource device communication protocol, functionality available from a plurality of resource devices; advertise, to a resource management system via a resource management system communication protocol that is different than the at least one resource device communication protocol, a plurality of logical functions that correspond to the functionality available from the plurality of resource devices; receive, from the resource management system via the resource management system communication protocol, a request to utilize a subset of the plurality of logical functions to provide a Logically Composed System (LCS); configure, via the at least one resource device communication protocol, the subset of the plurality of logical functions to provide LCS; and provide, to a client device, the LCS using the subset of the plurality of logical functions.

BRIEF DESCRIPTION OF THE DRAWINGS

FIG. 8 is a flow chart illustrating an embodiment of a method for providing resource device functionality for an LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
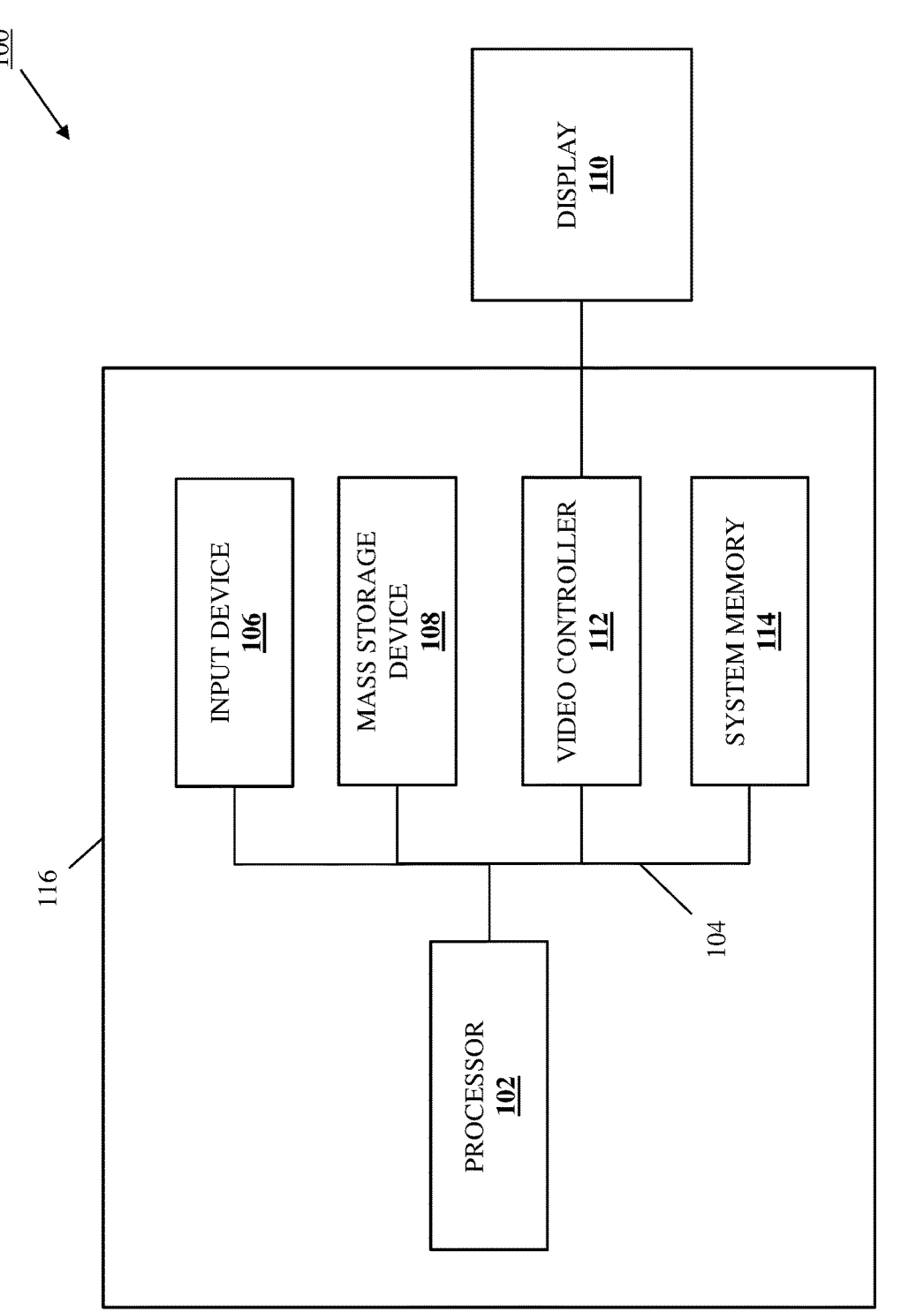
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) resource device functionality provisioning systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
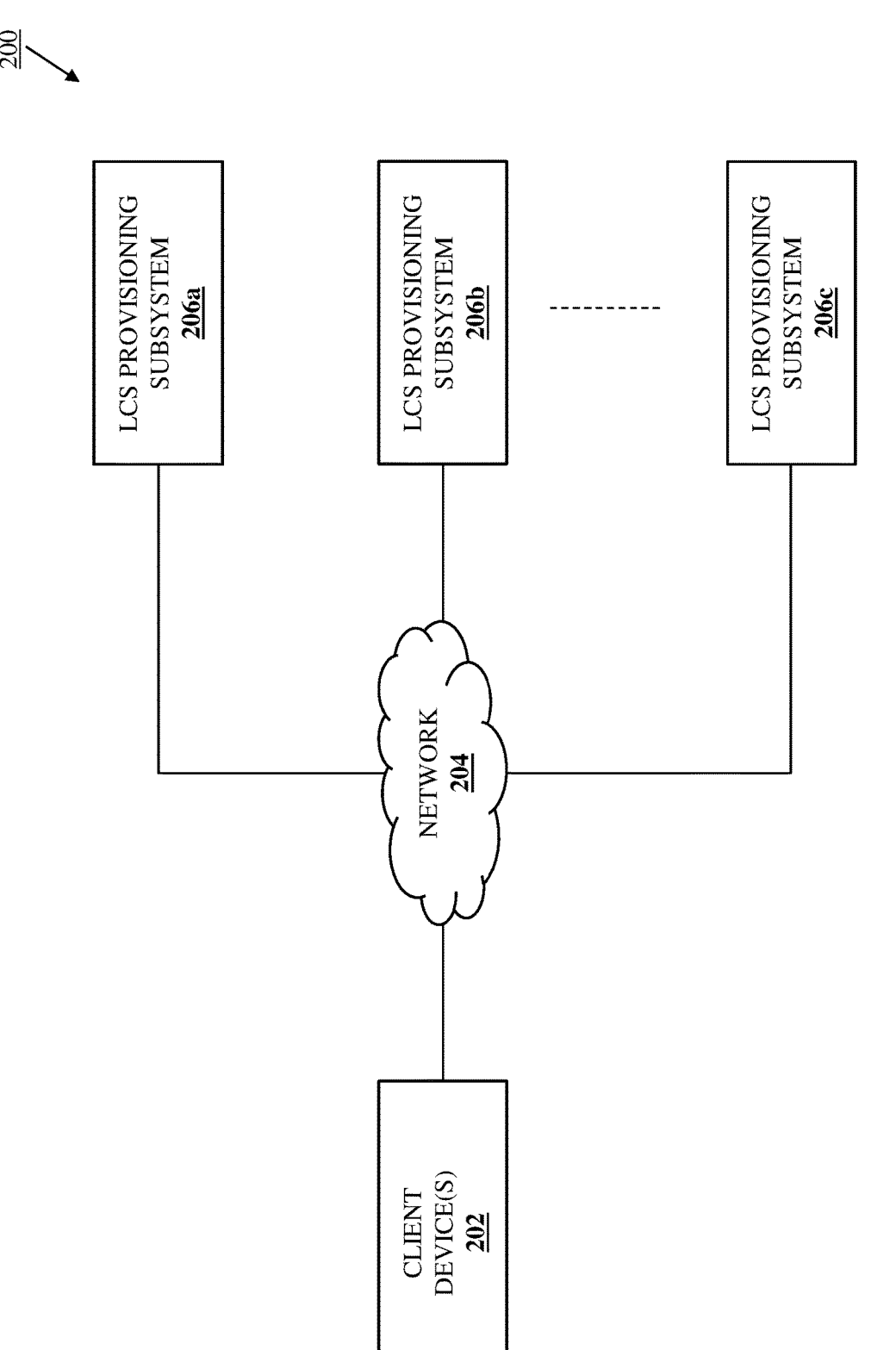
FIG. 2 is a schematic view illustrating an embodiment of an LCS provisioning system.

With reference to FIG. 2, an embodiment of an LCS provisioning system 200 is illustrated that may be utilized with the LCS resource device functionality provisioning systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200

(e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
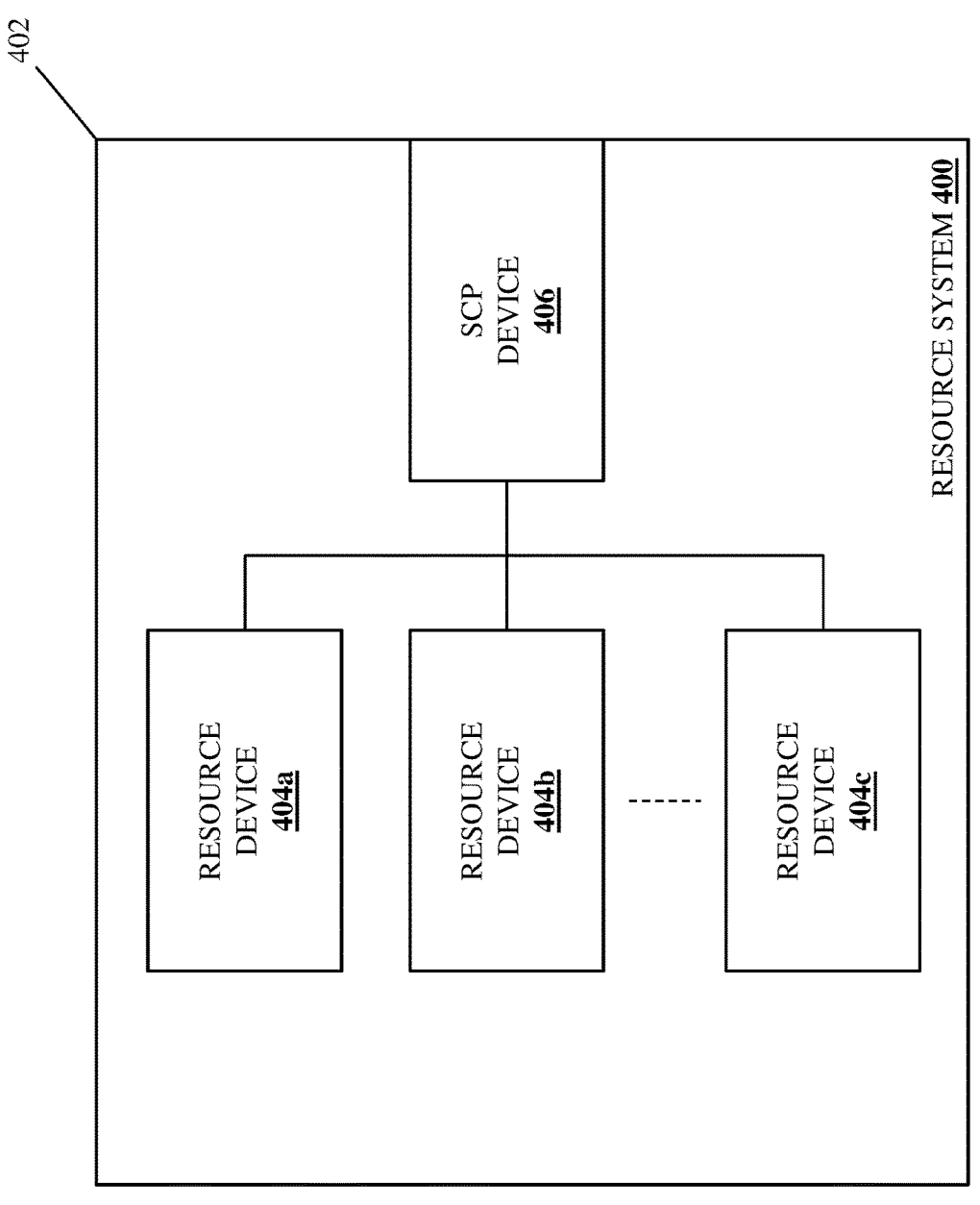
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/ systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
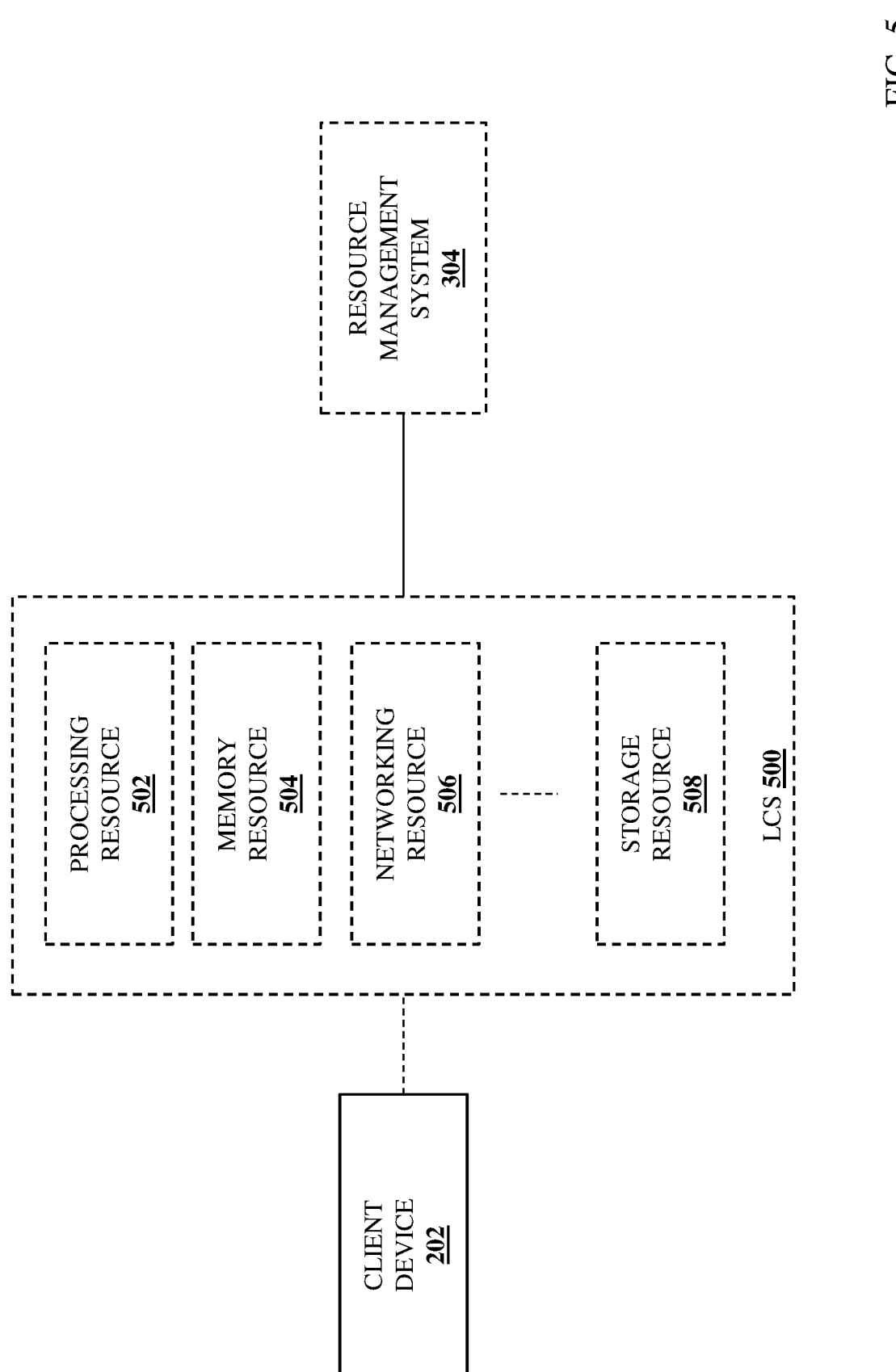
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
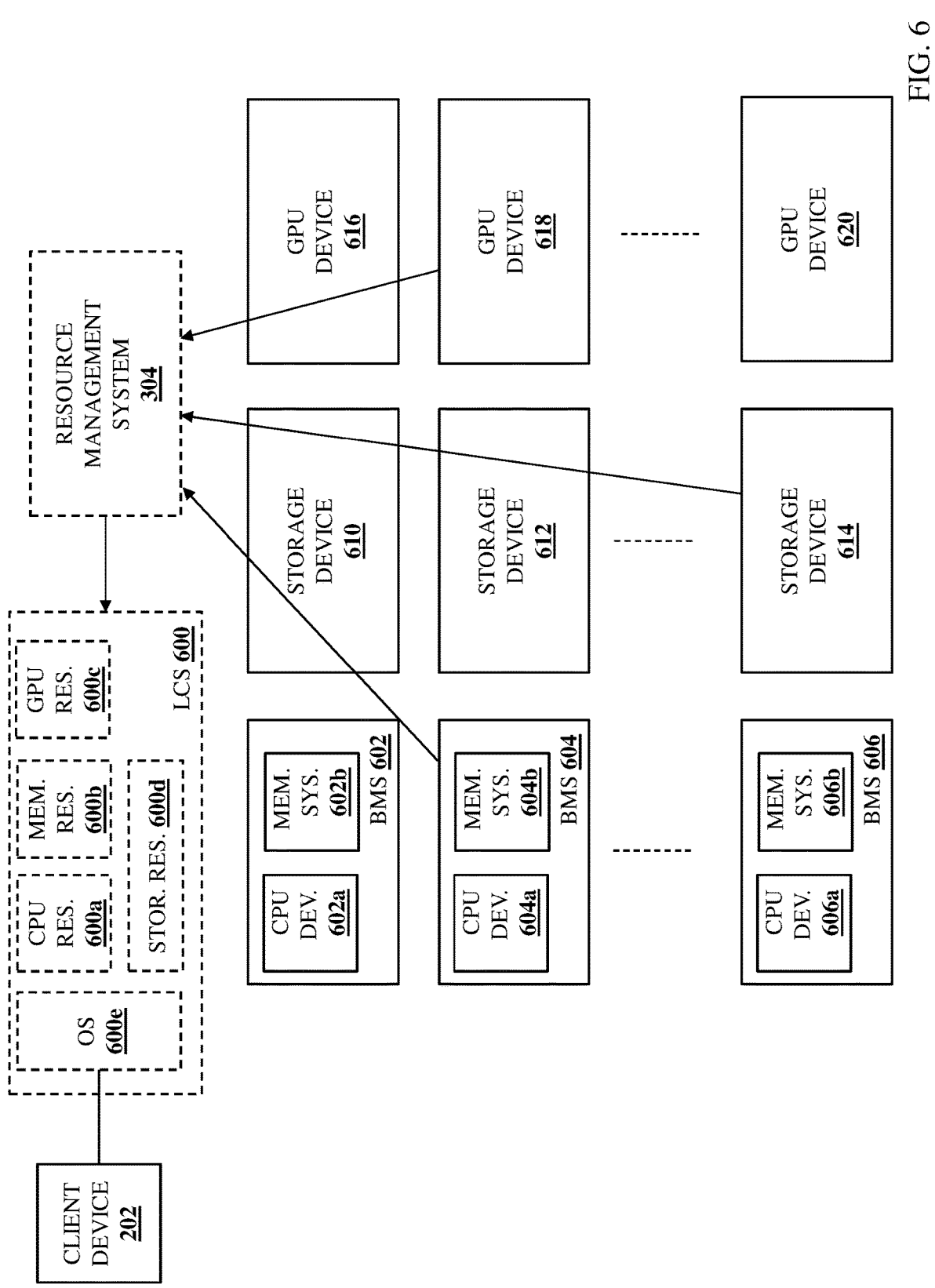
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/ CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
FIG. 7 is a schematic view illustrating an embodiment of an LCS resource device functionality provisioning system provided according to the teachings of the present disclosure.

Referring now to FIG. 7, an embodiment of a LCS resource device functionality provisioning system provided according to the teachings of the present disclosure is illustrated. In the illustrated embodiment, the LCS resource device functionality provisioning system includes a resource system 700 that may be provided by the resource system 400 discussed above with reference to FIG. 4. As such, the resource system 700 may be provided by the IHS 100 discussed above with reference to FIG. 1, and/or may include some or all of the components of the IHS 100, and in specific examples may include a BMS system as described above. However, while illustrated and discussed as being provided by a BMS system, one of skill in the art in possession of the present disclosure will recognize that resource systems provided in the LCS resource device functionality provisioning system may include any resource systems that may be configured to operate similarly as discussed below.

In the illustrated embodiment, the resource system 700 includes resource devices 704, 706, and up to 708, and one of skill in the art in possession of the present disclosure will appreciate how the resource devices 704-708 may be provided by the resource devices 404a-404c discussed above with reference to FIG. 4. Furthermore, in the illustrated embodiment, each of the resource devices 704, 706, and 708 are illustrated as including one or more components 704a, 706a, and 708a, respectively. In the illustrated embodiment, the resource system 700 also includes an SCP device 710, and one of skill in the art in possession of the present disclosure will appreciate how the SCP device 710 may be provided by the SCP 406 discussed above with reference to FIG. 4, or alternatively by any of the DPU devices described above. As discussed above, orchestrator devices such as the SCP device or DPU device described herein may provide resource devices/functionality via components or other hardware included on the orchestrator device. As such, the resource devices 704-708 illustrated in FIG. 7 and discussed below may include resource devices that are actually provided on the SCP device 710 (rather than coupled to the SCP device 710 as illustrated) while remaining within the scope of the present disclosure as well.

As discussed above, SCP device 710 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine 710a that is configured to perform the functionality of the SCP engines and/or SCP devices discussed below. In a specific example, the SPC engine 710a may include an SCP agent (e.g., the orchestrator agent discussed below) provided in an SCP operating system included in the SCP device 710, although other SCP engines (or DPU engines) will fall within the scope of the present disclosure as well.

In the illustrated embodiment, the SCP device 710 in the resource system 700 is coupled to a resource management system 711, which one of skill in the art in possession of the present disclosure will appreciate may be provided by the resource management system 304 discussed above with reference to FIG. 3. Furthermore, each of the SCP device 710 and the resource management system 711 are coupled to a client device 712, which one of skill in the art in possession of the present disclosure will appreciate may be provided by 202 discussed above with reference to FIG. 2. However, while a specific LCS resource device functionality provisioning system has been illustrated and described, one of skill in the art in possession of the present disclosure will appreciate how the LCS resource device functionality provisioning system of the present disclosure may be provided using a variety of components and/or component configurations while remaining within the scope of the present disclosure as well.

Referring now to FIG. 8, an embodiment of a method 800 for providing resource device functionality for a Logically Composed System (LCS) is illustrated. As discussed below, the systems and methods of the present disclosure provide an orchestrator device in a resource system that identifies, collects, and presents functionality included in accessible resource devices as logical functions to a resource management system, allowing the resource management system to compose an LCS via selection of those logical functions. For example, the LCS resource device functionality provisioning system of the present disclosure may include an orchestrator device coupled to resource devices and a resource management system. The orchestrator device identifies functionality available from the resource devices via at least one resource device communication protocol, and advertises logical functions that correspond to the functionality available from the resource devices to the resource management system via a resource management system communication protocol that is different than the at least one resource device communication protocol. When the orchestrator device receives a request from the resource management system via the resource management system communication protocol to utilize a subset of the logical functions to provide an LCS, it configures the subset of the logical functions to provide the LCS via the at least one resource device communication protocol, and provides the LCS to a client device using the subset of the logical functions. As such, the resource management system may efficiently and easily compose LCSs based on presented logical functions, while the orchestrator device may manage the provisioning of the resource device functionality corresponding to those logical functions to the composed LCS.

As discussed above, conventional REST-based management techniques utilized in conventional computing devices are not scalable in a manner that will allow the LCSs discussed above to be easily and efficiently composed from a variety of physical and logical functionality available from resource devices in different domains. For example, orchestrator devices like the SCP devices and DPU devices discussed herein many have access to unique functionality across resource devices from different vendors that may be made available for composing an LCS, but presenting such vendor-unique functionality via conventional REST-based management techniques presents substantial scaling issues. Embodiments of the present disclosure address such issues by replacing the conventional REST-based management techniques utilized in resource systems such as server devices with an orchestrator device having an orchestrator agent (e.g., running on an orchestrator operating system) that is configured to discover resource devices, identify physical and logical functionality of those resource devices that is available for use in providing an LCS, determine composite functionality that may be provided via combinations of the identified physical and/or logical functionality, and/or perform any other orchestrator operations discussed below, while also allowing its orchestrator device to be discovered by a resource management system in any domain in a topology.

As such, the LCS resource device functionality provisioning system of the present disclosure allows orchestrator devices and their resource devices to be discovered by a resource management system, and provides a hierarchical model for resource device data collection by the orchestrator device in order to simplify the reporting of functionality of available resource devices to the resource management system. For example, any functionality available from resource devices or the orchestrator device may be discoverable by the orchestrator engine/agent in the orchestrator device, and the orchestrator engine/agent may then incorporate that functionality into a common data model that abstracts that functionality as logical functions that may then be presented to the resource management system. As will be appreciated by one of skill in the art in possession of the present disclosure, the orchestrator engine of the present disclosure may be configured to collect any combination of data from resource devices in order to map the logical functions discussed below to the functionality of those resource devices defined by that data (e.g., capabilities, features, and sub-features of the resource devices and/or orchestrator device) in order to provide an LCS, as well as to map those logical functions to a workload intent "manifest" that defines an LCS.

As described below, any data collection performed by the orchestrator engine in the orchestrator device may be relatively logical in nature, providing for assembly and presentation of any functionality of the resource devices and/or orchestrator device as logical functions to the resource management system. As such, the orchestrator device/orchestrator engine may operate as a single, logical function/resource device functionality provisioning access point for the resource management system, thus enabling the presentation of any functionality available for composing an LCS to the resource management system, enabling the requesting of that functionality to provide an LCS by the resource management system, and/or enabling any of the other benefits described below.

Figure 9:
FIG. 9 is a schematic view illustrating an embodiment of the LCS resource device functionality provisioning system of FIG. 7 operating during the method of FIG. 8.

The method 800 begins at block 802 where an orchestrator device identifies functionality available from resource devices using resource device communication protocol(s). With reference to FIG. 9, in an embodiment of block 802, the SCP engine 710a in the SCP device 710 may perform resource device functionality identification operations 900 that includes identifying any functionality available from the component(s) 704a, 706a, and 708a in the resource devices 704, 706, and 708, respectively. For example, each of the resource devices 704-708 may be configured to report the functionality available from its respective component(s) 704a, 706a, and 708a, and thus may operate at block 802 to generate functionality identification communications that identify that functionality, and transmit those functionality identification communications to the SCP engine 710a in the SCP device 710.

As will be appreciated by one of skill in the art in possession of the present disclosure, any of the resource devices 704-708 may be configured to communication via a resource device communication protocol, and in many scenarios at least one of the resource devices 704-708 will communicate using a resource device communication protocol that is different than another of the resource devices 704-708 (and with some embodiments including discrete communication protocols utilized by each of the resource devices 704-708). For example, one of the resource devices 704-708 may include a Baseboard Management Controller (BMC) device having a REST-based management interface such as the REDFISH® management interfaces discussed above, with the BMS device communicating via the REST-based management interface using a resource device communication protocol provided by a Hyper-Text Transfer Protocol (HTTP) to identify the functionality of the component(s) in the BMC device.

In another example, one of the resource devices 704-708 may include an accelerator device having a Peripheral Component Interconnect express (PCIe) data interface and a private agent interface, with that accelerator device communicating via the PCIe data interface using a resource device communication protocol provided by a PCIe protocol to identify the functionality of at least some of the component(s) in the accelerator device, and with that accelerator device communicating via the private agent interface using a resource device communication protocol provided by a Remote Procedure Call (RPC) protocol to identify the functionality of at least some of the component(s) in the accelerator device.

In another example, one of the resource devices 704-708 may include an "as-a-Service" (-aaS) application having a private interface and a locator interface, with that -aaS application communicating via the private interface using a resource device communication protocol provided by a socket protocol to identify the functionality of at least some of the component(s) in the -aaS application, and with that -aaS application communicating via the locator interface using a resource device communication protocol provided by a Multi-Domain Name Service (mDNS) protocol to identify the functionality of at least some of the component(s) in the -aaS application.

In another example, one of the resource devices 704-708 may include a physical feature having a private interface, with that physical feature communicating via the private interface using a resource device communication protocol provided by a Management Component Transport Protocol (MCTP) to identify the functionality of the component(s) in the physical feature. However, while several specific resource devices and resource device communication protocols have been described, one of skill in the art in possession of the present disclosure will appreciate how other resource devices and resource device communication protocols will fall within the scope of the present disclosure as well.

As such, the SCP engine 710a in the SCP device 710 may operate as a functionality registration mechanism for the resource devices 704-708, and may be configured to register functionality of any of the component(s) 704a-708a that may be reported by the resource devices 704-708 via disparate and/or discrete resource device communication protocols, resource device access characteristics, and/or data characteristics. As described below, the registration of functionality of any of the component(s) 704a-708a reported by the resource devices 704-708 by the SCP engine 710a eliminates any need for the resource management system 711 to have knowledge of the domains associated with the resource devices 704-708, configuration of the resource device communication protocols utilized by the resource devices 704-708, or ability to identify the logical functionality available from the resource devices 704-708.

In an embodiment, the functionality identified by the SCP engine 710a at block 802 may include the physical component(s) 704a-708a included in any of the resource devices 704-708 (e.g., a type of processing system, memory system, networking device, or storage device), the configuration of the physical component(s) 704a-708a included in any of the resource devices 704-708 (e.g., a number of cores in a processing system, a memory mirroring configuration of a memory system, a number of available ports on a networking device, a storage size of a storage device), operations available via the physical component(s) 704a-708a included in any of the resource devices 704-708 (an accelerator operation available from a processing system, a battery back-up storage operation available in a memory system, a data encryption operation available in a networking device, a data compression operation available in a networking device, a RAID storage operation available in a storage device), and/or any other information that one of skill in the art in possession of the present disclosure would recognize as describing any functionality available from the physical component(s) 704a-708a included in any of the resource devices 704-708.

Figure 10:
FIG. 10 is a schematic view illustrating an embodiment of the LCS resource device functionality provisioning system of FIG. 7 operating during the method of FIG. 8.

The method 800 then proceeds to block 804 where the orchestrator device advertises logical functions to a resource management system using a resource management system communication protocol. With reference to FIG. 10, in an embodiment of block 804, the SCP engine 710*a* in the SCP device 710 may perform logical function advertisement operations 1000 that include advertising logical functions to the resource management system 711 using a resource management protocol. In an embodiment, at block 804 and in response to identifying the functionality available from the resource devices 704-708, the SCP engine 710*a* in the SCP device 710 may determine logical functions that correspond to that functionality. Continuing with the example above of a resource device provided by a processing system, the SCP engine 710*a* in the SCP device 710 may determine that the functionality provided by that processing system includes a logical processing function, a plurality of logical core processing functions, a logical accelerator operation function, and/or any other logical functions that one of skill in the art in possession of the present disclosure would recognize as corresponding to functionality available from a processing system.

Continuing with the example above of a resource device provided by a memory system, the SCP engine 710*a* in the SCP device 710 may determine that the functionality provided by that memory system includes a logical memory function, a logical memory mirroring function, a logical battery back-up storage operation function, and/or any other logical functions that one of skill in the art in possession of the present disclosure would recognize as corresponding to functionality available from a memory system. Continuing with the example above of a resource device provided by a networking device, the SCP engine 710*a* in the SCP device 710 may determine that the functionality provided by that networking device includes a logical networking function, a logical port function, a logical data encryption operation function, a logical data compression operation function, and/or any other logical functions that one of skill in the art in possession of the present disclosure would recognize as corresponding to functionality available from a networking device.

Continuing with the example above of a resource device provided by a storage device, the SCP engine 710*a* in the SCP device 710 may determine that the functionality provided by that storage device includes a logical storage function, a logical storage size function, a logical RAID storage operation function, and/or any other logical functions that one of skill in the art in possession of the present disclosure would recognize as corresponding to functionality available from a storage device. However, while several specific examples of logical functions corresponding to functionality available from resource devices have been described, one of skill in the art in possession of the present disclosure will appreciate how logical functions may be determined for any capability of a physical or virtual resource device while remaining within the scope of the present disclosure as well.

In some embodiments, the determination of logical functions that correspond to the functionality available from the resource devices 704-708 may include the determination of composite logical functions providing using combinations of the functionality available from the resource devices 704-708. For example, continuing with the example above of a resource device provided by a networking device, the SCP engine 710*a* in the SCP device 710 may identify the data encryption functionality and the data compression functionality available from the networking device, and then determine a composite logical secure data transmission operation function that includes both the data encryption functionality and the data compression functionality available from the networking device (i.e., data transmitted by the networking device when the composite logical secure data transmission operation function is utilized will be both encrypted and compressed before being transmitted via a network). However, while a specific composite function has been described, one of skill in the art in possession of the present disclosure will recognize that any of a variety of composite functions may be determined from available resource device functionality while remaining within the scope of the present disclosure as well.

In an embodiment, at block 804, the SCP engine 710*a* in the SCP device 710 advertises the logical functions to the resource management system 711 using a resource management protocol such as a general-purpose Remote Procedure Call (gRPC) protocol. For example, the resource management system 711 may be configured to communicate with SCP devices in any resource system using the gRPC protocol, and thus need not be configured to communicate via any of the resource device communication protocols utilized by the resource devices 704-708 discussed above. As such, at block 804, the resource management system 711 may be presented with logical functions that correspond to any functionality available from the resource devices 704-708 in the resource system 700, as well as any functionality available from resource devices in any other resource systems coupled to the resource management system 711. Furthermore, in some embodiments, the SCP engines in different SCP devices may be discoverable by the resource management system 711 regardless of their domain and/or the topology, which allows the resource management system 711 to consider relative locations of SCP devices, resource devices, and/or client devices when determining how an LCS should be composed (e.g., using particular resource devices and/or SCP devices).

As discussed above, the orchestrator device in the resource system 700 (e.g., the SCP device 710 in FIG. 7) may also include resource devices that have associated functionality that may be identified at block 802. In some embodiments, the LCS resource device functionality provisioning system of the present disclosure may be designed to operate independently of the implementation of the orchestrator device via the use of a uniform Application Programming Interface (API) across disparate orchestrator device implementations. For example, a revision and vendor of an SCP device or DPU device may be identified as functionality provided by a resource device in that SCP device or DPU device, and then may be presented as logical function(s) to the resource management system 711. Similarly, upgrades, new features, and/or other functionality of the orchestrator device may be advertised as functionality extensions or availability. As such, any functionality available from resource devices included in the orchestrator device may be registered with and managed by the orchestrator engine (e.g., an orchestrator agent) in that orchestrator device.

Figure 11:
FIG. 11 is a schematic view illustrating an embodiment of the LCS resource device functionality provisioning system of FIG. 7 operating during the method of FIG. 8.

The method 800 then proceeds to block 806 where the orchestrator device receives a request to utilize a subset of the logical functions to provide an LCS from the resource management system via the resource management system communication protocol. With reference to FIG. 11, in an embodiment of block 806, the client device 712 may perform workload intent provisioning operations 1100 that include expressing a workload intent that describes the general requirements of a workload that a user of the client device 712 would like to perform, similarly as described above. In response to receiving the workload intent from the client device 712, the resource management system 711 may compose an LCS that satisfies that workload intent using the logical functions advertised by the SCP device 710 at block 804. For example, at block 806 the resource management system 711 may identify a subset of the logical functions that are advertised by the SCP device 710 and that satisfy the workload intent provided by the client device 712 by, for example, determining processing resources, memory resources, networking resources, and/or storage resources that will satisfy that workload intent, and then identifying a subset of the logical functions that are being advertised by the SCP device 710 and that provide those processing resources, memory resources, networking resources, and/or storage resources.

As such, at block 806, the resource management device 1102 may perform logical function request operations 1102 that include providing a request to the SCP device 710 using the resource management protocol such as the gRPC protocol discussed above, and with that request defining an LCS based on the subset of logical functions that were identified as satisfying the workload intent. As such, the SCP engine 710a in the SCP device 710 may receive the request to utilize the subset of the logical functions to provide an LCS at block 806.

Figure 12:
FIG. 12 is a schematic view illustrating an embodiment of the LCS resource device functionality provisioning system of FIG. 7 operating during the method of FIG. 8.

The method 800 then proceeds to block 808 where the orchestrator device configures the subset of logical functions to provide the LCS using the resource device communication protocol(s). With reference to FIG. 12, in an embodiment of block 808 and in response to receiving the request to utilize the subset of logical functions, the SCP engine 710a in the SCP device 710 may perform logical function configuration operations 1200 that include configuring the subset of the logical functions identified in the request received from the resource management system 711 at block 806 to provide an LCS that satisfies the workload intent provided by the client device 712 to the resource management system 711 at block 806. As such, at block 808, the SCP engine 710a in the SCP device 710 may perform any configuration operations that one of skill in the art in possession of the present disclosure would recognize as configuring any of the resource devices 704-708 to perform their functionality that corresponds to the subset of logical functions requested by the resource management system 711 as discussed above in order to provide an LCS that satisfies the workload intent provided by the client device 712 to the resource management system 711 at block 806. Similarly as discussed above, the configuration of any of the resource devices 704-708 at block 806 by the SCP engine 710a may be performed using the respective resource device communication protocol for that resource device as discussed above.

To provide a specific example, the logical function configuration operations 1200 may include configuring a processing system, a memory system, a networking device, and a storage device that are provided by the resource devices 704-708 (as well as any other resource devices that would be apparent to one of skill in the art in possession of the present disclosure) to operate and communicate with each other and the client device 712 in a manner that satisfies the workload intent provided by the client device 712 to the resource management system 711 at block 806. For example, a core in a processing system may be configured with a memory device in a memory system to provide an operating system for the LCS, with a networking device configured to encrypt and compress data that is sent by the operating system over a network, as well as decompress and decrypt data received over the network before providing that data to the operating system, and with a storage device configured to store data from the operating system in a RAID array. However, while specific configurations are described as being performed above, one of skill in the art in possession of the present disclosure will appreciate how different workload intents will require different resource device configurations that will fall within the scope of the present disclosure as well. Furthermore, while FIG. 12 illustrates the configuration of all of the resource devices 704-708 at block 808, one of skill in the art in possession of the present disclosure will appreciate how the subset of logical functions configured at block 808 may provide for the configuration of only a subset of the resource devices 704-708 while remaining within the scope of the present disclosure as well.

Figure 13:
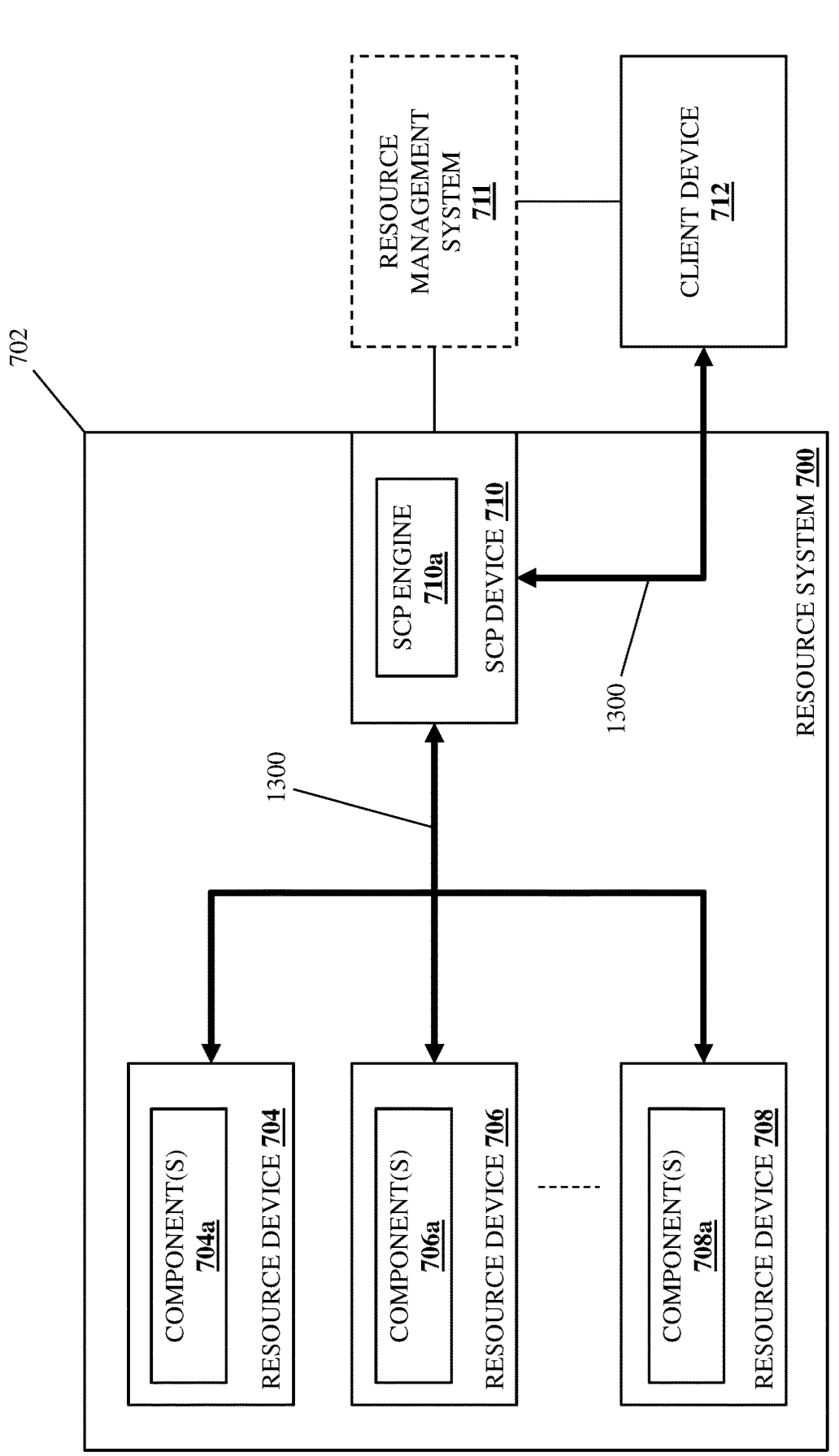
FIG. 13 is a schematic view illustrating an embodiment of the LCS resource device functionality provisioning system of FIG. 7 operating during the method of FIG. 8.

The method 800 then proceeds to block 810 where the orchestrator device provides the LCS to a client device using the subset of logical functions. With reference to FIG. 13, in an embodiment of block 810, the SCP engine 710a in the SCP device 710 may perform LCS provisioning operations 1300 that include any data/communication transmission that one of skill in the art in possession of the present disclosure would appreciate as providing an LCS to the client device 712 as discussed above. As such, the SCP engine 710a may operate to transmit data between the client device 712 and any of the resource devices 704-708 in order to enable the client device 712 to request operations from the LCS, instruct the resource devices 704-708 to perform functionality that performs those operations, provide any data results from the performance of those operations to the client device 712, and/or perform any other LCS operations that would be apparent to one of skill in the art in possession of the present disclosure.

In an embodiment, the provisioning of the LCS to the client device 712 at block 810 may include the SCP engine 710a in the SCP device 710 optimizing the logical functions being used to provide that LCS. For example, in the event the workload intent provided by the client device 712 was satisfied by the functionality of a first processing system corresponding a logical processing function with a minimum processing speed, and the SCP engine 710a determines that the first processing system can no longer process data at that minimum processing speed, the SCP engine 710a may then identify a second processing system that can process data at that minimum processing speed, and configure that second processing system to provide the LCS. However, while a specific resource device has been described, one of skill in the art in possession of the present disclosure will appreciate how the SCP device 710 may provide a first logical function using first functionality available from a first resource device in order to provide the LCS during a first time period, and may provide the first logical function using second functionality available from a second resource device in order to provide the LCS during a second time period that is subsequent to the first time period.

Thus, systems and methods have been described that provide an orchestrator device in a resource system that identifies, collects, and presents functionality included in accessible resource devices as logical functions to a resource management system, and then allows the resource management system to compose an LCS via selection of those logical functions. For example, the LCS resource device functionality provisioning system of the present disclosure may include an orchestrator device coupled to resource devices and a resource management system. The orchestrator device identifies functionality available from the resource devices via at least one resource device communication protocol, and advertises logical functions that correspond to the functionality available from the resource devices to the resource management system via a resource management system communication protocol that is different than the at least one resource device communication protocol. When the orchestrator device receives a request from the resource management system via the resource management system communication protocol to utilize a subset of the logical functions to provide an LCS, it configures the subset of the logical functions to provide the LCS via the at least one resource device communication protocol, and provides the LCS to a client device using the subset of the logical functions. As will be appreciated by one of skill in the art in possession of the present disclosure, the orchestrator device (e.g., the orchestrator then agent discussed above) provides a control/presentation model for any resource device that solves the issues discussed above with conventional REST-based management techniques, and allows any resource device added to a resource system to have its functionality identified and presented to a resource management system as a logical function that may be utilized to provide an LCS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) resource device functionality provisioning system, comprising:
a resource management system;
a resource system that is coupled to the resource management system;
a plurality of resource devices that are included in the resource system; and
an orchestrator device that is included in the resource system, coupled to the plurality of resource devices and the resource management system, and configured with a respective resource device communication protocol for each of the plurality of resource devices and a resource management system communication protocol for the resource management system that is different than the respective resource device communication protocols, wherein the orchestrator device is configured to:
identify, via direct communications with each of the plurality of resources devices using the respective resource device communication protocol for that resource device, functionality available from the plurality of resource devices that includes at least one of processing functionality, memory functionality, networking functionality, and storage functionality;
advertise, to the resource management system via communications with the resource management system using the resource management system communication protocol, a plurality of logical functions that correspond to the functionality available from the plurality of resource devices and that include at least one of a logical processing function that corresponds to the processing functionality, a logical memory function that corresponds to the memory functionality, a logical networking function that corresponds to the networking functionality, and a logical storage function that corresponds to the storage functionality, wherein each logical function is a composite logical function determined by utilizing functionalities available from at least two of the plurality of resource devices;
receive, from the resource management system via communications with the resource management system using the resource management system communication protocol, a request to utilize a subset of the plurality of logical functions to provide a Logically Composed System (LCS) that satisfies requirements of a workload intent specified by a user;
configure, via direct communications with each of the plurality of resources devices using the respective resource device communication protocol for that resource device, the plurality of logical functions to provide the LCS; and
provide, to a client device, the LCS using the plurality of logical functions.

2. The system of claim 1, wherein the plurality of resource devices include at least one of a Baseboard Management Controller (BMC) device, an accelerator device, a resource device providing an as-a-Service application, and a resource device including a physical feature having a private interface.

3. The system of claim 1, wherein respective resource device communication protocols include at least one of a Hyper-Text Transfer Protocol (HTTP), a Peripheral Component Interconnect express (PCIe) protocol, a Remote Procedure Call (RPC) protocol, a Multi-Domain Name Service (mDNS) protocol, and a Management Component Transport Protocol (MCTP).

4. The system of claim 1, wherein the orchestrator device is configured to:
provide, during a first time period, a first logical function included in the plurality of logical functions using first functionality available from a first resource device included in the plurality of resource devices; and
provide, during a second time period that is subsequent to the first time period, the first logical function using second functionality available from a second resource device included in the plurality of resource devices.

5. The system of claim 1, wherein the functionality available from the plurality of resource devices includes at least one physical hardware characteristic of at least one of the plurality of resource devices, and at least one operation performed by at least one of the plurality of resource devices.

6. An Information Handling System (IHS), comprising:
a chassis;
a processing system that is housed in the chassis; and
a memory system that is housed in the chassis, that is coupled to the processing system, and that includes instructions that, when executed by the processing system, cause the processing system to provide an orchestrator engine that is configured with a respective resource device communication protocol for each of a plurality of resource devices included in the chassis, and a resource management system communication protocol for a resource management system that is coupled to the processing system, wherein the resource management system communication protocol is different than the respective resource device communication protocols, and wherein the orchestrator engine is configured to:
identify, via direct communications with each of the plurality of resources devices using the respective resource device communication protocol for that resource device, functionality available from the plurality of resource devices that includes at least one of processing functionality, memory functionality, networking functionality, and storage functionality;

advertise, to a resource management system via communications with the resource management system using the resource management system communication protocol, a plurality of logical functions that correspond to the functionality available from the plurality of resource devices and that include at least one of a logical processing function that corresponds to the processing functionality, a logical memory function that corresponds to the memory functionality, a logical networking function that corresponds to the networking functionality, and a logical storage function that corresponds to the storage functionality, wherein each logical function is a composite logical function determined by utilizing functionalities available from at least two of the plurality of resource devices;

receive, from the resource management system via communications with the resource management system using the resource management system communication protocol, a request to utilize a subset of the plurality of logical functions to provide a Logically Composed System (LCS) that satisfies requirements of a workload intent specified by a user;

configure, via direct communications with each of the plurality of resources devices using the respective resource device communication protocol for that resource device, the plurality of logical functions to provide the LCS; and provide, to a client device, the LCS using the plurality of logical functions.

7. The IHS of claim 6, wherein the plurality of resource devices include at least one of a Baseboard Management Controller (BMC) device, an accelerator device, a resource device providing an as-a-Service application, and a resource device including a physical feature having a private interface.

8. The IHS of claim 6, wherein the respective resource device communication protocols include at least one of a Hyper-Text Transfer Protocol (HTTP), a Peripheral Component Interconnect express (PCIe) protocol, a Remote Procedure Call (RPC) protocol, a Multi-Domain Name Service (mDNS) protocol, and a Management Component Transport Protocol (MCTP).

9. The IHS of claim 6, wherein the orchestrator engine is configured to:

provide, during a first time period, a first logical function included in the plurality of logical functions using first functionality available from a first resource device included in the plurality of resource devices; and provide, during a second time period that is subsequent to the first time period, the first logical function using second functionality available from a second resource device included in the plurality of resource devices.

10. The IHS of claim 6, wherein the functionality available from the plurality of resource devices includes at least one physical hardware characteristic of at least one of the plurality of resource devices.

11. The IHS of claim 6, wherein the functionality available from the plurality of resource devices includes at least one operation performed by at least one of the plurality of resource devices.

12. A method for providing resource device functionality for an Logically Composed System (LCS), comprising:

identifying, by an orchestrator device in a resource system via direct communications with each of a plurality of resources devices in the resource system using a respective resource device communication protocol for that resource device, functionality available from the plurality of resource devices that includes at least one of processing functionality, memory functionality, networking functionality, and storage functionality;

advertising, by the orchestrator device to a resource management system that is coupled to the resource system via communications with the resource management system using the resource management system communication protocol that is different than the respective resource device communication protocols, a plurality of logical functions that correspond to the functionality available from the plurality of resource devices and that include at least one of a logical processing function that corresponds to the I processing functionality, a logical memory function that corresponds to the memory functionality, a logical networking function that corresponds to the networking functionality, and a logical storage function that corresponds to the storage functionality, wherein each logical function is a composite logical function determined by utilizing functionalities available from at least two of the plurality of resource devices;

receiving, by the orchestrator device from the resource management system via communications with the resource management system using the resource management system communication protocol, a request to utilize a subset of the plurality of logical functions to provide a Logically Composed System (LCS) that satisfies requirements of a workload intent specified by a user;

configuring, by the orchestrator device via direct communications with each of the plurality of resources devices using the respective resource device communication protocol for that resource device, the plurality of logical functions to provide the LCS; and providing, by the orchestrator device to a client device, the LCS using the plurality of logical functions.

13. The method of claim 12, wherein the plurality of resource devices include at least one of a Baseboard Management Controller (BMC) device, an accelerator device, a resource device providing an as-a-Service application, and a resource device including a physical feature having a private interface.

14. The method of claim 12, wherein the resource device communication protocols include at least one of a Hyper-Text Transfer Protocol (HTTP), a Peripheral Component Interconnect express (PCIe) protocol, a Remote Procedure Call (RPC) protocol, a Multi-Domain Name Service (mDNS) protocol, and a Management Component Transport Protocol (MCTP).

15. The method of claim 12, further comprising:

providing, by the orchestrator device during a first time period, a first logical function included in the plurality of logical functions using first functionality available from a first resource device included in the plurality of resource devices; and providing, by the orchestrator device during a second time period that is subsequent to the first time period, the first logical function using second functionality available from a second resource device included in the plurality of resource devices.

16. The method of claim 12, wherein the functionality available from the plurality of resource devices includes at least one physical hardware characteristic of at least one of the plurality of resource devices.

17. The method of claim 12, wherein the functionality available from the plurality of resource devices includes at least one operation performed by at least one of the plurality of resource devices.

\* \* \* \* \*